Jan. 24, 1961     C. J. FOSTER ET AL     2,969,488
EXTENDED FOIL CAPACITOR
Filed July 17, 1958
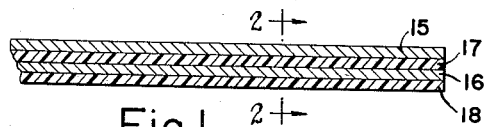
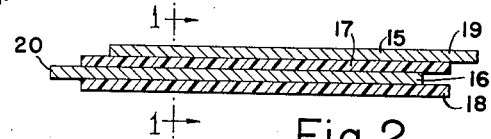
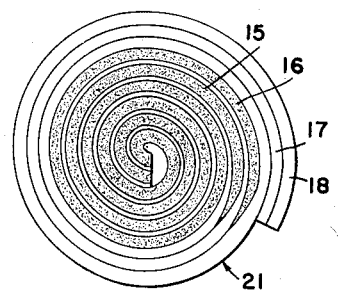
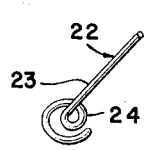
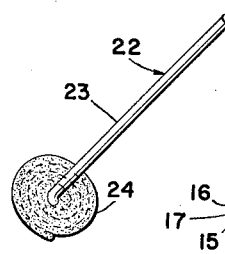
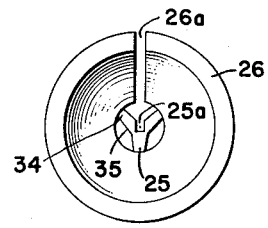
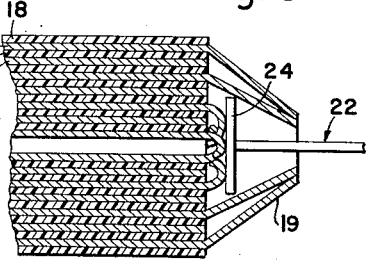
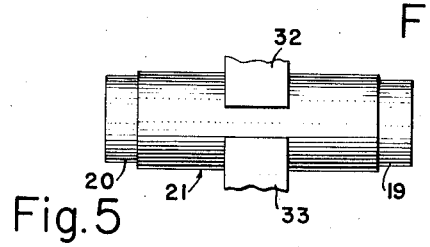
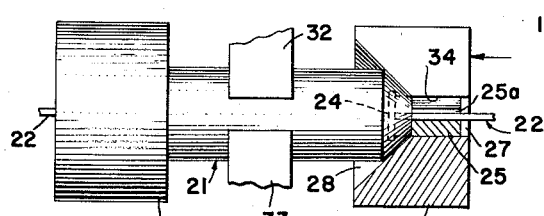
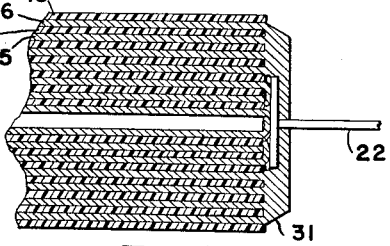
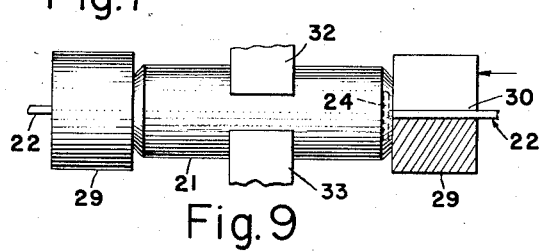
INVENTORS
CYRIL J. FOSTER &
BENJAMIN S. NAVEN
BY *Wolfe, Hubbard, Voit & Osann*
ATTORNEY United States Patent Office 2,969,488
Patented Jan. 24, 1961

2,969,488

EXTENDED FOIL CAPACITOR

Cyril J. Foster and Benjamin S. Naven, Chicago, Ill., assignors, by direct and mesne assignments, to Dearborn Electronic Laboratories of Delaware, Inc., Orlando, Fla., a corporation of Delaware Filed July 17, 1958, Ser. No. 749,236

3 Claims. (Cl. 317—260)

This invention relates to an extended foil capacitor and method of making the same, and more particularly to a method of fastening lead wires to the electrodes of such capacitors and to the resultant capacitor structure.

The term "extended foil capacitor" is used in the trade to designate a capacitor construction comprising laminated layers of metallic electrodes separated by dielectric strips, all tightly wound into a cylindrical body. The lead wires are connected to the respective longitudinal edges of the electrodes—that is, they extend outwardly from the opposite ends of the complete tubular product. The electrodes are usually made of tin or aluminum foil, and are separated from each other by a dielectric film such as paper or plastic—examples of the latter being Mylar and polystyrene. Each foil electrode is oriented with respect to its associated dielectric film so that a longitudinal edge of the electrode extends outwardly from the film along one side thereof to permit a lead wire to be connected thereto; and correspondingly, the dielectric film projects beyond the electrode along the other longitudinal edge thereof. In the tubular winding operation, the electrodes are disposed so that the respective outer or overhanging metal edges thereof are on opposite sides of the capacitor. Necessarily then, the outer edge of one electrode and inner edge of the other are offset laterally to assure electric isolation therebetween.

Following the winding operation terminal leads are connected to the respective ends of the capacitor, and if the capacitors are to have a moisture impervious interior, this condition must be achieved by sealing the ends in some manner, as by wrapping the same in plastic, coating them in wax or resins, etc.

It is accordingly an object of this invention to provide a capacitor that which is inherently moistureproof and obviates the need for the wrapping and sealing normally required. Another object of the invention is the provision of a novel extended foil capacitor in which the terminal electrodes or lead wires are mechanically secured to the foil electrodes without the use of solder, to afford an anchorage having a strength greatly in excess of that attained by soldering or other modes of connection conventionally employed.

Still another object is in the provision of an interlock between the lead wires and electrodes of an extended foil capacitor, wherein the foil is densely packed around all of the surfaces of the head or convoluted end of the leads to provide an intimate electrical and mechanical connection. Yet another object is to provide a capacitor wherein the longitudinal edges of the electrodes project from the body thereof are overhanging, and in which these edges are integrated into a solid mass that not only electrically and mechanically connects the lead wires thereto, but affords a moisture impervious barrier at the ends of the capacitor.

A further object of the invention is that of providing a method of affixing flat-headed lead wires to the ends of an extended foil capacitor, in which the leads are first pressed forcibly partially into the center layers and wherein the outer layers are then partially formed about the head to hold the same therein, and are thereafter compacted into coin shape by a force sufficient to integrate the edges into a unitary mass and thereby anchor the lead wires in place and electrically connect the same to the electrodes. Additional objects and advantages of the invention will become apparent as the specification develops.

An embodiment of the invention is illustrated in the accompanying drawing, in which—

Figure 1 is an enlarged, broken longitudinal sectional view taken generally along the line 1—1 of Figure 2, and illustrating the laminated character of the foil electrodes and dielectric film strips before the winding thereof; Figure 2 is an enlarged, transverse sectional view taken along the line 2—2 of Figure 1, and showing the overhanging and offset orientation of the laminated films; Figure 3 is an end view in elevation of a tight-wound extended foil capacitor before the lead wires are connected thereto; Figure 4 is a perspective view of a lead wire; Fig. 4a is similar to Fig. 4 but shows a preferred form of flat-headed lead wire in which the convolutions are soldered together; Figure 5 is a top plan view of the capacitor shown in Figure 3; Figure 6 is an end view in elevation of one of the coining dies; Figure 7 is a top plan view of the capacitor showing the first step in the assembly process; Figure 8 is an enlarged, broken vertical sectional view showing the capacitor following the assembly step of Figure 7; Figure 9 is a top plan view of the capacitor showing the final step in the assembly process; and Figure 10 is an enlarged, broken vertical sectional view illustrating the configuration of the capacitor after the lead wires are connected thereto.

The capacitor is formed from a plurality of elongated strips comprising laminated layers of conductive foil that define the electrodes and dielectric film interposed therebetween. Figures 1 and 2 illustrate such construction most clearly, and in these figures the electrodes are denoted with the numerals 15 and 16 and the dielectric film with the numerals 17 and 18. As stated hereinbefore, the electrodes are generally formed of aluminum or tin foil, although other conductive materials could be employed. The dielectric film strips 17 and 18 are shown as plastic and may be Mylar, polystyrene, or other suitable dielectric materials such as paper. For the winding operation, the laminations are oriented as shown in Figure 2, wherein the electrode 15 has an edge 19 that overhangs one side of the dielectric film 17; and similarly, the electrode 16 has an edge 20 that overhangs the dielectric layer 18. It will be apparent that the overhanging edges 19 and 20 are located on opposite sides of the laminated structure, but the dielectric strips 17 and 18 are in parallel alignment. Further, the inner edge of the electrode 15 is separated from the overhanging edge 20 of the electrode 16; and similarly, the inner edge of the electrode 16 is spaced from and thereby electrically separated from the overhanging edge of the electrode 15.

Since capacitors each have a value selected from a wide range thereof, the length and/or diameter of the product 21 shown in Figures 3 and 5 will vary considerably. Thus, if the value of a capacitor is to be increased, the facing surface areas of the electrodes will be increased, this being accomplished either by providing electrodes of greater width or by increasing the number of turns which in effect increases the length of the electrodes. In any event, the overhanging longitudinal edges 19 and 20 of the elecerodes project outwardly with substantially uniform width beyond the solid body portions thereof. It should be noted that the laminations are extremely thin, and are in the order of a few thousandths of an inch. Consequently, the delineation between the overhanging edges 19 and 20 and body portion of the capacitor is exaggerated in Figures 5 and 7 through 10 for purposes of more clearly illustrating the invention.

Conventionally, the lead wires adopt the form illustrated in Figure 4. Thus, the leads 22 comprise a relatively straight shaft 23, convoluted as shown at 24, to provide a relatively large substantially flat head with a surface area oriented at generally right angles with respect to the axis of the shaft 23. However, other arrangements may be adopted for increasing the surface area at one end of the lead so as to facilitate connection thereof to the capacitor electrodes. Preferably, if a convoluted wire is used, the convolutions are coated with solder as shown in Fig. 4a to make the same a unitary member and prevent unwinding thereof.

In the first step of the lead assembly process which is illustrated in Figure 7, the enlarged heads 24 of the leads are forced bodily into the center portions of the overhanging edges 19 and 20 of the electrodes. This may be accomplished by means of a ram or plunger 25 dimensioned to abut the end 24 of the lead and to press it inwardly. The ram is fixedly related to and thereby a part of a first coining die 26. The die is slotted at 26a and the ram slotted or channeled at 25a so that the shank 23 of the lead 22 can be inserted into the channel 25a by movement thereof through the slot 26a. Referring to Figure 8, it will be apparent that this inward movement of the lead 22 (resulting from inward movement of the die and ram) does not disturb or disorient the outer layers of the edges 19 and 20, but of course distorts the central layers thereof and compresses the same.

The die 26 is provided with a cylindrical opening 27, into which the ram 25 extends and is welded or otherwise rigidly secured thereto. The opening communicates with a frusto-conical cavity 28 that tapers inwardly toward the center of the die. As the lead is being pressed into the electrode end as shown in Figure 7, the die 26 is advancing toward the center of the capacitor whereupon the cavity 28 presses the outer convolutions of the end 19 inwardly. The die 26 and ram are then removed, leaving the capacitor in the configuration shown in Figure 8. It will be apparent that the outer convolutions extend over the enlarged end 24 of the lead and thereby hold it in place as the die and ram are removed. This step bends the extended outer layers of the electrodes inwardly into frusto-conical shape and predisposes the metal to movement or flow thereof about the enlarged end of the lead in the final step which now will be described.

A second coining die 29 having a central opening 30 extending longitudinally therethrough is pressed against the preformed end 19, and the shaft of the lead 22 extends freely through the opening 30. The die 29 flattens the end 19, and the force applied is sufficient to integrate the foil into a unitary coin-shaped mass 31, as shown in Figure 10. At this stage, the leads and capacitor are integral with one another and no special or additional encasement is necessary. However, if desired, the unit may be wrapped in an insulating sheath having a farad value, voltage rating, etc. stamped thereon.

During the operations illustrated in Figures 7 and 9, the capacitor may be held between the jaws 32 and 33 of a releasable clamp. Further, the respective leads 22 are preferably pressed into the ends 19 and 20, and both ends coined or preformed simultaneously, and are then flattened at the same time by a pair of dies 29. The dies may be reciprocated by air pressure, for example, or by any other suitable means. A stepped or two-stage press can be used, and preferably stops are employed to limit inward movement of the dies and thereby prevent damage to the capacitor body.

Most desirably, plunger or ram 25 has a minimum body mass in cross section for as the ram increases in size, it necessarily occupies more space within the confines of the extended ends of the capacitor and thereby decreases the amount of foil engageable with the outer surface of the lead wire head 24 to hold it in its inward position when the coining die and ram are removed. On the other hand, the ram should be effective to substantially center the lead wire head within the extended end and prevent tipping or angulation thereof during the insertion. Thus, the ram configuration shown in Figure 6 is preferable in that it provides a three-point contact with the head 24 and thereby prevents canting or tipping thereof, but yet has a minimized cross sectional area whereby a relatively large electrode mass can surround the head of the lead wire. In Figure 6, the widely spaced contact points on the ram are designated with the numeral 34 and the recessed areas thereof with the numeral 35.

It will be noted in Figure 10 that the foil is solidly packed on all sides of the head 24 of the lead wire or terminal electrode, and thus electrical contact is established therebetween throughout an enlarged surface area, thereby minimizing electrical resistance. In addition, a large mass of compact foil is located outside of the head 24 of the lead which prevents pulling off of the lead when subjected to a pull or jerk and regardless of whether applied straight or at an angle. Also, the entire interconnection is accomplished without the use of solder and is far superior, both in terms of electrical and mechanical characteristics, than the solder connections usually employed. Moreover, the integration of the various convolutions into a unitary mass provides a moisture barrier that appears to be substantially impervious. In fact, in humidity tests that were made in conformity with the standard Army-Navy-Air Force Specification MIL-C-25A, as amended by Supplements 1, 2 and 3, fifty test specimens were found to have zero loss of resistance through a ten-day test period comprising two complete cycles. Such results are not achieved in an ordinary capacitor even when the ends thereof are sealingly enclosed in a moisture-proof cover therefor.

The process is especially adapted for use with capacitors having a foil thickness of from ¼ to one mil; and as a specific example of the process, the following is set forth: Laminated foil electrodes and Mylar dielectric strips each having a thickness of approximately ½ mil were wound on a mandrel to form an extended foil capacitor body. After winding, the body had a length of about 1⅛ inches and a diameter of about 5/16 inch. Lead wires, each having a convoluted head measuring about ⅛ of an inch thereacross and coated with solder to present a solid face, were inserted in the coining dies and rams, and were pressed into against the ends of the capacitor body with a force of approximately eighty pounds. The dies were actuated by air pressure, and stops were provided for engagement by the dies to limit the extent of inward movement thereof. The flattening dies 29 were then pressed against the coined ends of the capacitor, and exerted a force thereon of approximately 160 pounds. These dies were also actuated by air pressure, and stops were used to limit the inward movement thereof. The finished capacitor had a total length of approximately ⅞ of an inch. In a test made to determine the force required to withdraw one of the electrodes from the capacitor, it was found that the necessary force was about double that which would pull out a lead wire from a conventionally fabricated capacitor.

It is advantageous to coat the convoluted ends of the lead wires with a conductive adhesive before insertion thereof into the capacitor ends, for this procedure further enhances the anchorage of the lead wires to the respective electrodes. An example of such an adhesive is a resin plastic thoroughly saturated with particulate silver, and the lead wire ends can be dipped into a solution thereof just prior to their insertion. The solution hardens after the lead wires are in place, and is found to give both a good anchorage and excellent electrical connection between the lead wires and electrodes.

While in the foregoing specification an embodiment of the invention has been set forth in detailed description for purposes of adequately disclosing the same, it will be apparent that those skilled in the art may make numerous changes therein without departing from the spirit and principles of the invention.

In the following claims the term "flat-headed" as applied to the terminal electrodes or leads 22 refers to an electrode in which the end portion thereof extends laterally to provide a generally flat supporting and conducting surface at right angles to the axis, for example, as disclosed in Figs. 4 and 4a. The term "coin-shaped" as applied to the mass 31 at the respective ends of the electrode is intended to denote an integral tightly compacted mass of foil "coined" into a generally disc-shaped cap of solid metal.

We claim:

1. In an extended foil capacitor structure, alternate laminations of dielectric and electrode strips wound into a generally cylindrical configuration, one of said electrodes having a longitudinal edge thereof extending a uniform distance outwardly at one end of the cylindrical configuration and another of said electrodes having a longitudinal edge extending a uniform distance outwardly from the other end, and a pair of leads each equipped at one end thereof with a head, each head being seated upon the central portion of the respective extended longitudinal edges, the remaining portion of said extended edges being deformed inwardly in covering relation with said heads and the various convolutions thereof being integrated into a compact coin-shaped unitary mass substantially impervious to moisture penetration.

2. In a capacitor structure of the character described, a pair of elongated foil electrodes and dielectric film strips, said electrodes and dielectric strips being oriented in laminated juxtaposition and coiled in tightly wound convolutions to define a solid generally cylindrical capacitor body, each of said electrodes having a longitudinal edge respectively extending outwardly from opposite ends of the capacitor body, and a pair of leads each equipped at one end thereof with an enlarged head forced into the interior of the respective electrode edges and seated upon the central convolutions thereof to form a mass of electrode foil along the inner surface thereof, the outer convolutions of the extended electrode edges being compacted inwardly to surround the respective heads and unite with the same to form integral coin-shaped masses at the respective ends of the capacitor to sealingly close the ends of the capacitor body against moisture penetration and to constrain the heads of the leads therewithin.

3. In an extended foil capacitor having a pair of offset electrodes wound into layers and providing outwardly extending convoluted edges projecting a uniform distance at the respective ends of the capacitor, a pair of terminal electrodes having substantially flat heads seated upon and embedded in the central convolutions at each end, the peripheral convolutions being compacted inwardly to intimately surround the heads of the respective terminal electrodes thereby to integrate such heads into respective unitary coin-shaped masses of foil which are substantially impervious to moisture penetration.

References Cited in the file of this patent

UNITED STATES PATENTS 2,470,045     Nagy _____ May 10, 1949